United States Patent
McLean et al.

(10) Patent No.: US 10,489,720 B2
(45) Date of Patent: Nov. 26, 2019

(54) SYSTEM AND METHOD FOR VENDOR AGNOSTIC AUTOMATIC SUPPLEMENTARY INTELLIGENCE PROPAGATION

(71) Applicant: SecureWorks Corp., Wilmington, DE (US)

(72) Inventors: Lewis I. McLean, Edinburgh (GB); Angus W. Smithson, Edinburgh (GB)

(73) Assignee: SecureWorks Corp., Wilmington, DE (US)

(*) Notice: Subject to any disclaimer, the term of this patent is extended or adjusted under 35 U.S.C. 154(b) by 149 days.

(21) Appl. No.: 15/584,816

(22) Filed: May 2, 2017

(65) Prior Publication Data
US 2018/0322410 A1 Nov. 8, 2018

(51) Int. Cl.
*G06F 11/00* (2006.01)
*G06N 20/00* (2019.01)
*H04L 29/06* (2006.01)
*G06F 21/56* (2013.01)
*G06F 21/55* (2013.01)

(52) U.S. Cl.
CPC .......... *G06N 20/00* (2019.01); *G06F 21/554* (2013.01); *G06F 21/56* (2013.01); *H04L 63/1425* (2013.01); *G06F 11/00* (2013.01)

(58) Field of Classification Search
CPC ...... G06F 9/445; G06F 17/2715; G06F 21/54; G06F 21/564; G06N 5/025; G06N 99/005; H04L 63/0218; H04L 63/1425
See application file for complete search history.

(56) References Cited

U.S. PATENT DOCUMENTS

| | | | |
|---|---|---|---|
| 8,977,638 B2 | 3/2015 | Bath et al. | |
| 9,112,895 B1* | 8/2015 | Lin | H04L 63/1416 |
| 9,838,405 B1* | 12/2017 | Guo | H04L 63/1416 |
| 10,135,848 B2* | 11/2018 | Muddu | H04L 63/1416 |
| 2005/0206514 A1* | 9/2005 | Zanovitch | G06Q 10/08 340/506 |
| 2010/0031353 A1 | 2/2010 | Thomas et al. | |
| 2013/0055145 A1* | 2/2013 | Antony | G05B 19/41875 715/781 |
| 2013/0097706 A1 | 4/2013 | Titonis et al. | |
| 2016/0164873 A1 | 6/2016 | Das et al. | |
| 2017/0092109 A1* | 3/2017 | Trundle | B60L 11/1824 |
| 2017/0344901 A1* | 11/2017 | Ronen | G06N 5/04 |
| 2018/0096157 A1* | 4/2018 | Israel | G06F 21/6218 |

\* cited by examiner

*Primary Examiner* — Joshua P Lottich
(74) *Attorney, Agent, or Firm* — Larson Newman, LLP

(57) ABSTRACT

An information handling system includes a storage and a processor. The storage is configured to store network activity logs from a first client system and a second client system. The processor is configured to receive a security alert from the first client system, analyze the security alert to obtain a plurality of indicators, utilize the supplementary indicators to build a statistical security model, and analyze activity on the second client system using the statistical security model to identify an additional security events.

18 Claims, 3 Drawing Sheets

SYSTEM AND METHOD FOR VENDOR AGNOSTIC AUTOMATIC SUPPLEMENTARY INTELLIGENCE PROPAGATION

FIELD OF THE DISCLOSURE

This disclosure generally relates to information handling systems, and more particularly relates to vender agnostic automatic supplementary intelligence propagation.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

An information handling system includes a storage and a processor. The storage is configured to store logs pertinent to information security from a first client system and a second client system. The processor may receive security alerts from the first client system, analyze the one or more security alerts to obtain a plurality of indicators, utilize the supplementary indicators to build a statistical security model, and analyze activity on the second client system using the statistical security model to identify additional security events.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
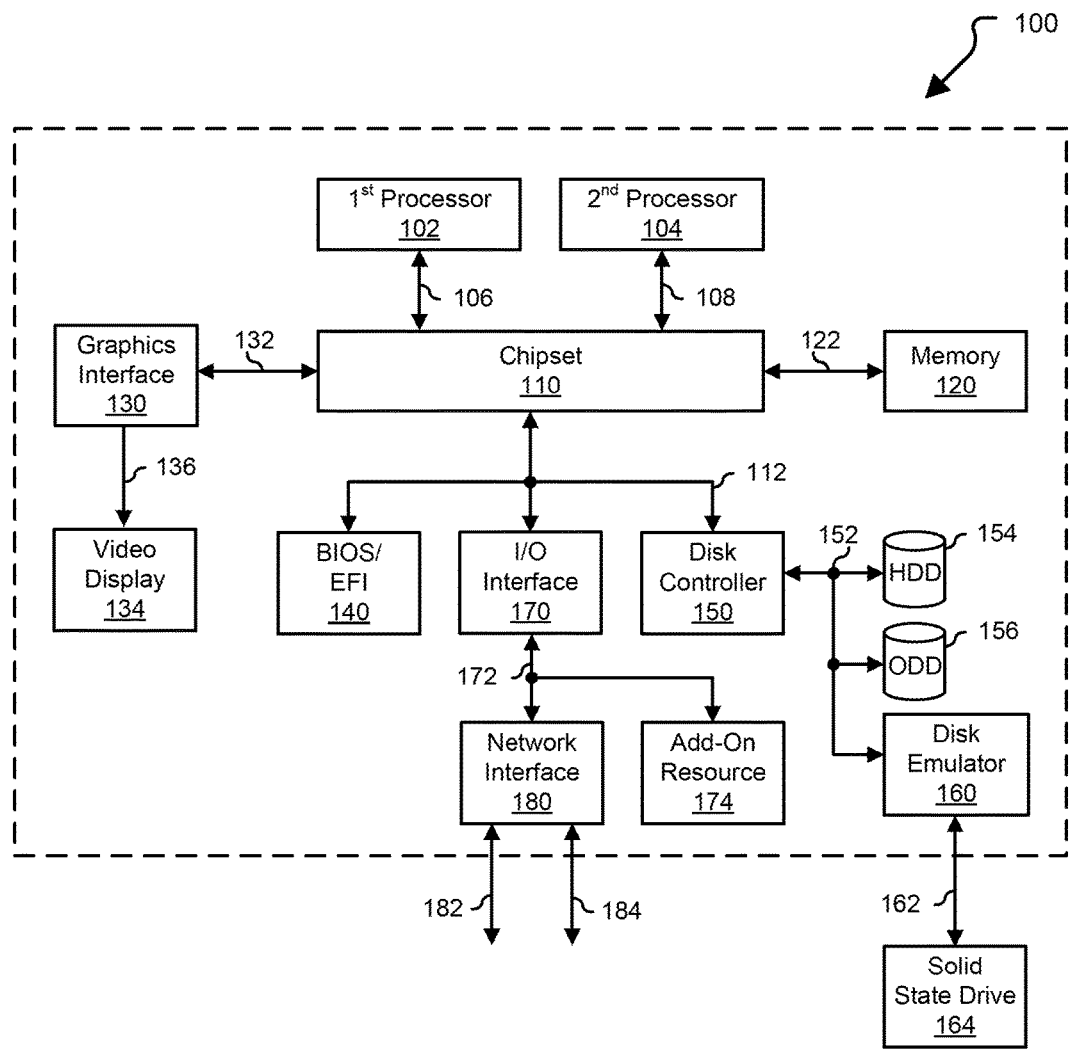
FIG. 1 illustrates a block diagram of an information handling system according to one aspect of the disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
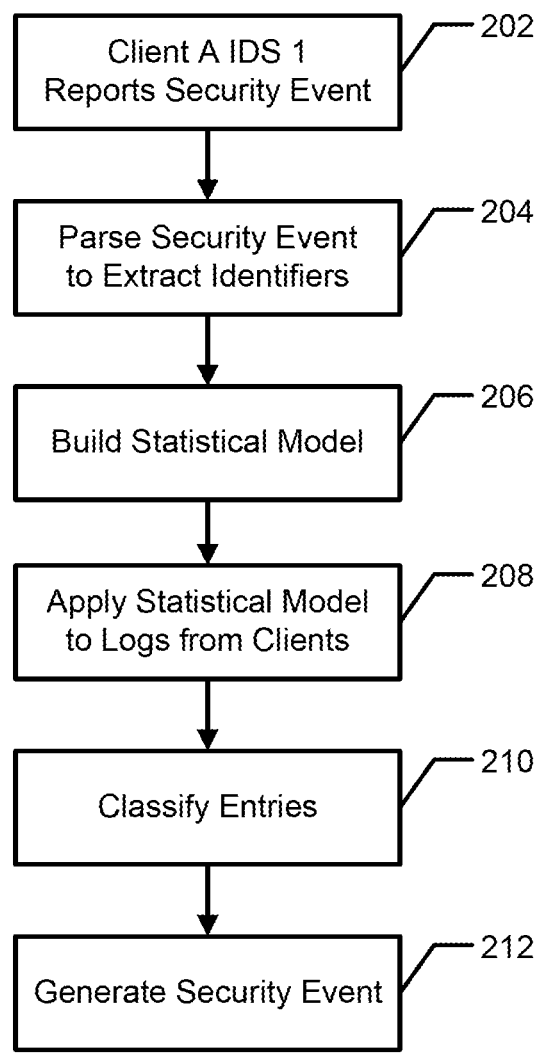
FIG. 2 depicts a flow diagram of a process for automatic intelligence propagation.

FIG. 2 shows a flow diagram illustrating a method for automatic intelligence propagation. While this exemplary method depicts the use of Intrusion Detection Systems (IDS), the method does not rely solely on this log source. Any log source of security related events are applicable. At 202, an IDS at client A can detect a security event and provide a security alert to the automated intelligence propagation system. In various embodiments, the IDS can match network packets to signatures of known threats, and generate a security alert when networks packets are found to match a signature of malice. The security alert can include an originating Internet Protocol (IP) address, a target IP address, an enumerated description of the threat such as MITRE ATT&CK, a URL, an HTTP header, ports used, and the like.

At 204, the automated intelligence propagation system can parse the security alert to extract identifiers. In various embodiments, the identifiers can include an HTTP header or parts thereof, an origination IP address, a target IP address, a URL, or the like. While the originating alert was, for example, detected by means of packet analysis, this does not lessen the value of the intelligence of the supplementary indicators not related to the original event. This is common practice within information security where signatures are developed for a strain of malware but the infrastructure that supports the Command & Control (C2) can change depending on the target and malicious attacker. Leveraging the IP address not originally related to the initial alert allows the system to pivot to leverage more detections that the packet analysis alone.

At 206, the automated intelligence propagation system could build a security model of the security event to determine a likelihood that an event matching one or more of the supplementary identifiers is malicious. In various embodiments, machine learning techniques, such as random forest or other techniques known in the art, can be used to determine which identifiers act as supplementary indicators of threat activity and to weight the various supplementary indicators. The security model can be built with data from security events as well as log data of non-malicious network activity. In various embodiments, the security model can be a rules-based Boolean model or a statistical probability model. The rules-based Boolean model may provide a binary indication of malice, whereas a statistical probability model may provide a non-binary probability of malicious activity. In various embodiments, the weighting of the rules-based Boolean model may provide a non-binary evaluation of maliciousness. For example, the statistical security model can provide an indication that activity from the originating IP is malicious. In some instances, the IP address can be a shared address for multiple systems, such as an IP address that is dynamically assigned or an IP address that is used as an outward facing address for network address translation (NAT). When only a portion of the traffic from an IP address is malicious, for example, 40% of the traffic is malicious, the statistical security model can, for example, give the IP address a score of 0.4. Combining the IP address score with scores for other supplementary indicators, such as which ports are used, can either increase or decrease the score resulting in an indication of more likely or less likely to be malicious.

At 208, the security model can be applied to logs from multiple client system. For example, the security model can be applied to stored logs of past activity from the same or other clients to identify security events that may have occurred in the past. In another example, the security model can be applied to logs provided by a client in real time to detect ongoing malicious activity.

At 210, the security model can be used to classify log entries as malicious or non-malicious, and at 212, the system can generate security events when the security model indicates a log entry is malicious, such as when the score for a network activity crosses a threshold. As with 204, leveraging the IP address not originally related to the initial alert allows the system to pivot to leverage more detections that the original client. Where the system is leveraging new signatures, the log store allows for the supplementary intelligence to be used to drive retrospective detections.

Figure 3:
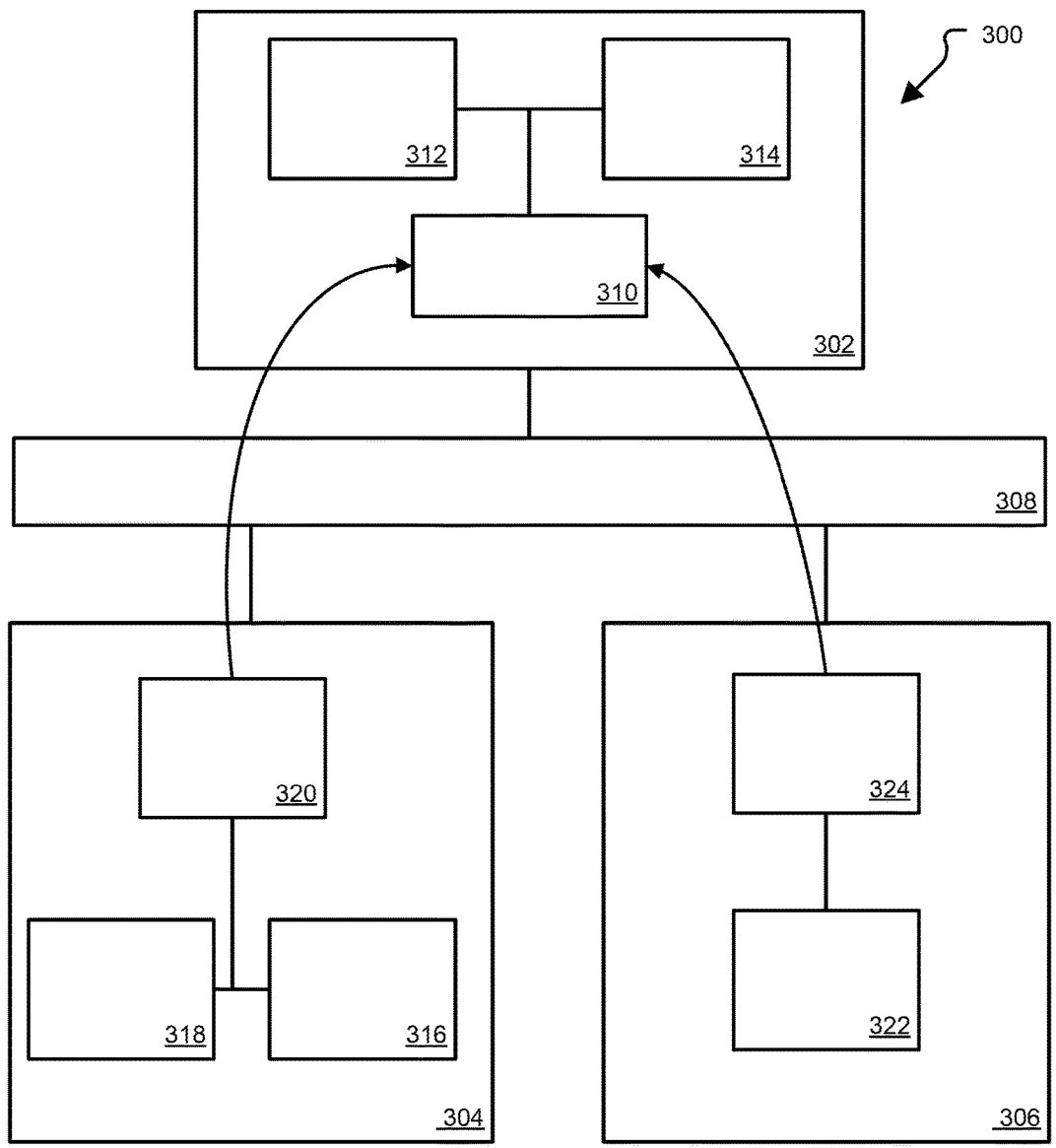
FIG. 3 depicts a block diagram of a system for automatic intelligence propagation.

FIG. 3 is a block diagram illustrating an exemplary system 300 for automatic intelligence propagation. System 300 can include intelligence propagation provider 302, client 304, client 306, and network 308. Network 308, such as the Internet, can provide connectivity between intelligence propagation provider 302, client 304, and client 306.

Intelligence propagation provider 302 can include ingest server 310 for receiving a parsing logs and events received from client 304 and client 306. Intelligence propagation provider 302 can also include a security model builder 312 and a log storage system 314. The security model builder 312 can extract supplementary information from the logs and events received by the ingest server 310 and build security models indicating the likelihood traffic matching the supplementary information is malicious. The log storage system 314 can store the logs and events received by the ingest server 310 to enable model building and retrospective analysis of activity at clients 304 and 306.

Client 304 can include an IDS 316, a firewall 318, and a client system 320. IDS 316 may compare network activity to known signatures of malicious activity to identify attempts at penetration of client 304. Firewall 318 can allow or block network activity based on a set of rules. Client system 320 can provide logs of IDS 316 and firewall 318 to the automatic intelligence propagation provider 302. Additionally, client system 320 may update firewall 318 to block activity based on a statistical security model provided by the automatic intelligence propagation provider 302.

Client 306 can include an IDS 322 and a client system 324. IDS 322 may compare network activity to known signatures of malicious activity to identify attempts at penetration of client 304. Client system 324 can provide logs of IDS 322 to the automatic intelligence propagation provider 302.

The automated propagation of supplementary intelligence can provide improved detection and response to malicious activity. For example, a first location may have an IDS with a activity signature for a malicious software. A second location may not have an IDS with the activity signature for the malicious software. Propagation of the supplementary intelligence to the second location may enable detection of the malicious software at the second site.

In another example, a client may detect a malicious activity after providing an IDS with updated signatures. The system for propagation of supplementary intelligence can retrospectively look at the logs provided by the client and determine if the client was subjected to the malicious activity prior to updating the IDS, enabling corrective steps to be taken.

In yet another example, a hacker may probe one or more locations for vulnerabilities using a variety of malicious tools. An IDS may identify some or all of the malicious tools individually to prevent an attack from succeeding. As a result, the statistical security model built based on the supplementary information from the multiple attempts may indicate that there is a high likelihood of malicious activity coming from the hackers system. If the hacker were to then use a malicious tool for which the IDS may not have a signature or probe a site without an IDS, the activity can be identified as malicious based on the hackers IP address. This can prevent the hacker from gaining access to systems even if a signature is not available to prevent a particular malicious tool.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a storage device configured to store network activity logs from a first set of client systems and a second set of client systems; and
   a processor configured to:
      receive a security alert from the first set of client systems;
      analyze the security alert to obtain a plurality of supplementary indicators;
      utilize the supplementary indicators to build a statistical security model; and
      analyze activity on the second set of client systems using the statistical security model to identify an additional security event,
   wherein the first set of client systems does not include the second set of client systems.

2. The information handling system of claim 1, wherein the activity is stored in a log of previous activity for the second set of client systems.

3. The information handling system of claim 2, wherein the additional security event is a previously undetected security event.

4. The information handling system of claim 1, wherein the activity of the second client system includes current activity on the second set of client systems.

5. The information handling system of claim 4, wherein the additional security event is an ongoing malicious activity.

6. The information handling system of claim 1, wherein the statistical security model provides a likelihood that activity is malicious based on one or more of the supplementary indicators.

7. A method for automated malware analysis, comprising:
   receiving alerts of one or more security events from a first set of client systems;
   analyzing the security event alerts to obtain a plurality of indicators;
   utilizing the indicators to build a statistical security model; and
   analyzing activity of a second set of client systems using the statistical security model to identify an additional security event,
   wherein the security alert is from the first set of client systems that does not include the second set of client systems.

8. The method of claim 7, wherein the activity is stored in a log of previous events for the second set of client systems.

9. The method of claim 8, wherein the additional security event is a previously undetected security event.

10. The method of claim 7, wherein the activity of the second client system includes logs of current activity on the second set of client systems.

11. The method of claim 10, wherein the additional security event is ongoing malicious activity.

12. The method of claim 7, wherein the statistical security model provides a likelihood that activity is malicious based on one or more of the supplementary indicators.

13. A non-transitory computer-readable medium including code that when executed causes a processor to perform a method, the method comprising:
   receiving alerts of one or more security events from a first set of client systems;
   analyzing the security event alerts to obtain a plurality of indicators;
   utilizing the indicators to build a statistical security model; and
   analyzing activity of a second set of client systems the statistical security model to identify an additional security event,
   wherein the security alert is from the first set of client systems that does not include the second set of client systems.

14. The non-transitory computer-readable medium of claim 13, wherein the activity is stored in a log of previous events for the second set of client systems.

15. The non-transitory computer-readable medium of claim 14, wherein the additional security event is a previously undetected security event.

16. The non-transitory computer-readable medium of claim 13, wherein the activity of the second client system includes logs of current activity on the second set of client systems.

17. The non-transitory computer-readable medium of claim 16, wherein the additional security event is ongoing malicious activity.

18. The non-transitory computer-readable medium of claim 13, wherein the statistical security model provides a likelihood that activity is malicious based on one or more of the supplementary indicators.

* * * * *

UNITED STATES PATENT AND TRADEMARK OFFICE
CERTIFICATE OF CORRECTION

PATENT NO.        : 10,489,720 B2
APPLICATION NO.   : 15/584816
DATED             : November 26, 2019
INVENTOR(S)       : Lewis I. McLean et al.

Page 1 of 1

It is certified that error appears in the above-identified patent and that said Letters Patent is hereby corrected as shown below:

In the Claims

Column 7, Line 22 in Claim 13: Please change "systems the" to -- systems using the --

Signed and Sealed this
Twenty-fourth Day of March, 2020

Andrei Iancu
*Director of the United States Patent and Trademark Office*